(12) United States Patent
Huang et al.

(10) Patent No.: US 12,030,102 B2
(45) Date of Patent: Jul. 9, 2024

(54) HEMMING SYSTEM AND METHOD THAT INCORPORATES EXPECTED SPRINGBACK TO FORM A CONTINUOUS PATH

(71) Applicant: Industrial Technology Research Institute, Hsinchu (TW)

(72) Inventors: Yi-Ping Huang, Taoyuan (TW); Ya-Hui Tsai, Taoyuan (TW); Wei-Chen Li, Hsinchu County (TW); Bor-Tung Jiang, Hsinchu (TW); Chia-Hung Wu, New Taipei (TW); Jen-Yuan Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 303 days.

(21) Appl. No.: 17/561,992

(22) Filed: Dec. 26, 2021

(65) Prior Publication Data

US 2023/0166315 A1    Jun. 1, 2023

(30) Foreign Application Priority Data

Nov. 26, 2021    (TW) .................................. 110144159

(51) Int. Cl.
  *G05B 19/401*    (2006.01)
  *B21D 39/02*    (2006.01)
  *G05B 19/18*    (2006.01)

(52) U.S. Cl.
  CPC ......... *B21D 39/021* (2013.01); *G05B 19/188* (2013.01); *G05B 19/401* (2013.01);
  (Continued)

(58) Field of Classification Search
  CPC .. B21D 39/021; G05B 19/188; G05B 19/401; G05B 2219/36203; G05B 2219/37403
  See application file for complete search history.

(56) References Cited

U.S. PATENT DOCUMENTS 6,477,879 B1 * 11/2002 Sawa ................... B21D 39/021
                                                      72/220
2012/0220194 A1    8/2012 Maloney et al.
(Continued)

FOREIGN PATENT DOCUMENTS

CN    105302959    2/2016
CN    106853433    6/2017
(Continued)

OTHER PUBLICATIONS

Kastle, C; "Springback Simulation of the Process Chain Press Line Forming and Roller Hemming Process", 2013, Key Engineering Materials, vol. 549, pp. 231-238. URL:<https://www.scientific.net/KEM.549.231> (Year: 2013).*

(Continued)

*Primary Examiner* — Kenneth M Lo
*Assistant Examiner* — Jonathan Michael Skrzycki
(74) *Attorney, Agent, or Firm* — JCIPRNET

(57) ABSTRACT

A hemming path planning method and a hemming system are provided. The hemming path planning method includes the following steps. An initial contour data of a target is scanned to obtain. A first segment of the hemming path is planned according to the initial contour data. The first segment corresponds to a first bending angle. A second segment of the hemming path is planned according to the initial contour data and an expected springback amount related to the first bending angle. The second segment corresponds to a second bending angle. The first segment and the second segment are combined to obtain a continuous hemming path.

9 Claims, 4 Drawing Sheets

(52) U.S. Cl.
CPC .............. *G05B 2219/36203* (2013.01); *G05B 2219/37403* (2013.01)

(56) References Cited

U.S. PATENT DOCUMENTS

| | | | |
|---|---|---|---|
| 2015/0363524 A1* | 12/2015 | Ilinich | G06F 30/23 703/1 |
| 2019/0255586 A1* | 8/2019 | Kanaeda | B21D 39/023 |
| 2020/0159187 A1 | 5/2020 | Zeng et al. | |
| 2020/0326185 A1 | 10/2020 | Tseng et al. | |
| 2021/0370377 A1* | 12/2021 | Stephan | B21D 31/005 |
| 2022/0118501 A1* | 4/2022 | Ren | G06F 30/23 |
| 2022/0212341 A1* | 7/2022 | Mehr | B25J 9/163 |
| 2023/0086958 A1* | 3/2023 | Sasada | B21D 11/12 73/854 |

FOREIGN PATENT DOCUMENTS

| | | |
|---|---|---|
| CN | 107422693 | 12/2017 |
| CN | 109530984 | 3/2019 |
| CN | 107479499 | 7/2019 |
| CN | 108363354 | 12/2019 |
| CN | 111216124 | 6/2020 |
| CN | 109725602 | 9/2021 |
| TW | 105707 | 11/1989 |
| TW | I316434 | 11/2009 |
| TW | 201516600 | 5/2015 |

OTHER PUBLICATIONS

"Office Action of Taiwan Counterpart Application", issued on Oct. 26, 2023, p. 1-p. 7.

S. J. Hosseininia et al., "Flexible Automation in Porcelain Edge Polishing Using Machine Vision", 9th International Conference Interdisciplinarity in Engineering, INTER-ENG 2015, Oct. 8-9, 2015, pp. 562-569.

Shipu Diao et al., "Development and Experimental Evaluation of a 3D Vision System for Grinding Robot", Sensors, vol. 18, Issue 3078, Sep. 2018, pp. 1-20.

JoséAntonio Dieste et al., "Environmentally Conscious Polishing System Based on Robotics and Artificial Vision", Advances in Mechanical Engineering, Oct. 2014, pp. 1-14.

S. Swillo et al., "Hemming Process Evaluation by Using Computer Aided Measurement System and Numerical Analysis", 10th International Conference on Technology of Plasticity (ICTP 2011), Sep. 2011, pp. 633-637.

Slawomir Świllo, "Experiment Apparatus for Sheet Metal Hemming Analysis", Computer Methods in Materials Science, vol. 13, Issue 2, 2013, pp. 326-332.

Zaojun Fang et al., "A Vision-Based Robotic Laser Welding System for Insulated Mugs with Fuzzy Seam Tracking Control", Symmetry, vol. 11, Issue 1385, Nov. 2019, pp. 1-15.

\* cited by examiner

HEMMING SYSTEM AND METHOD THAT INCORPORATES EXPECTED SPRINGBACK TO FORM A CONTINUOUS PATH

CROSS-REFERENCE TO RELATED APPLICATION

This application claims the priority benefit of Taiwan application Ser. No. 110144159, filed on Nov. 26, 2021. The entirety of the above-mentioned patent application is hereby incorporated by reference herein and made a part of this specification.

TECHNICAL FIELD

The technical field relates to a hemming path planning method and a hemming system.

BACKGROUND

General curved sheet metal automatic shaping is often used six-axis industrial-type processing tool, and the end of the processing tool is set to roll rolling wheel. Once the sheet metal is positioned, the processing tool follows a pre-set standard path for rolling and shaping. In order to improve processing yields, processes such as hemming are performed in stages. However, after each process, the sheet metal will have a different degree of springback amount at different locations, and the appearance of the sheet metal needs to be re-measured to modify the next processing path of the processing tool. As a result, the processing speed is difficult to improve, and if the accuracy of the measurement is not good, it will make the rolling wheel at the end of the processing tool and the sheet metal cannot maintain the accurate relative position and angle, seriously affecting the quality of the shaped products. In the above, the processing tool is, for example, a robotic arm.

SUMMARY

One of exemplary embodiments provides a hemming path planning method and a hemming system.

One of exemplary embodiments provides a hemming path planning method. The hemming path planning method includes the following steps. An initial contour data of a target is scanned to obtain. A first segment of the hemming path is planned according to the initial contour data. The first segment corresponds to a first bending angle. A second segment of the hemming path is planned according to the initial contour data and an expected springback amount related to the first bending angle. The second segment corresponds to a second bending angle. The first segment and the second segment are combined to obtain a continuous hemming path.

One of exemplary embodiments provides a hemming system. The hemming system includes a processing tool and a processor. The processing tool is configured to contact and apply pressure to a target. The processor is configured to: scan to obtain an initial contour data of the target; plan a first segment of a hemming path according to the initial contour data, where the first segment corresponds to a first bending angle; plan a second segment of the hemming path according to the initial contour data and an expected springback amount related to the first bending angle, where the second segment corresponds to a second bending angle; and combine the first segment and the second segment to obtain a continuous hemming path. The processing tool is configured to perform a hemming process on the target according to the hemming path obtained from the processor.

One of exemplary embodiments provides a hemming system. The hemming system includes a processing tool and a processor. The processing tool is configured to contact and apply pressure to a target. The processor is configured to: scan to obtain an initial contour data of the target; obtain a processing tangent vector according to the initial contour data and a processing position; obtain a processing position coordinate, a distribution angle, and a scaling factor according to the processing position and the processing tangent vector; obtain a weight function according to the scaling factor, the processing position, the distribution angle, and the processing position coordinate; obtain a processing normal vector according to the initial contour data, the processing position, and the weight function; plan a first segment of a hemming path according to the processing tangent vector and the processing normal vector, where the first segment corresponds to a first bending angle; plan a second segment of the hemming path according to the initial contour data and an expected springback amount related to the first bending angle, where the second segment corresponds to a second bending angle, and a method for the processor to obtain the expected springback amount related to the first bending angle includes finding a corresponding expected springback amount using a shaping direction and a path direction as coordinate axes; combine the first segment and the second segment to obtain a continuous hemming path. The processing tool is configured to perform a hemming process on the target according to the hemming path obtained from the processor.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate embodiments exemplary and, together with the description, serve to explain the principles of the disclosure.

DETAILED DESCRIPTION OF DISCLOSED EMBODIMENTS

Figure 1:
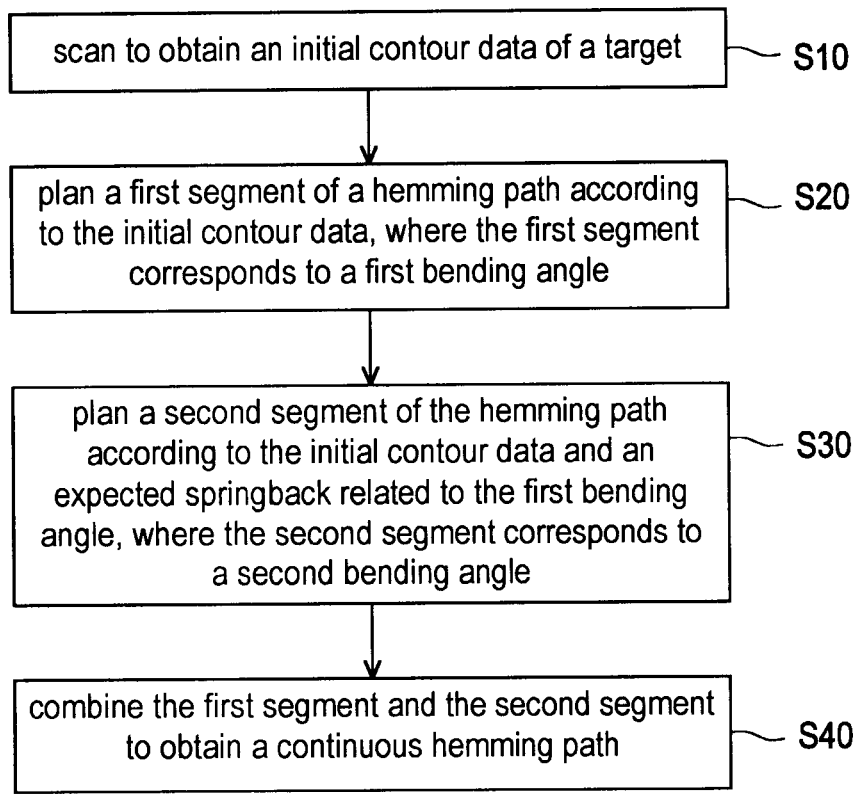
FIG. 1 is a process flowchart of a hemming path planning method according to an embodiment of the disclosure.
Figure 2:
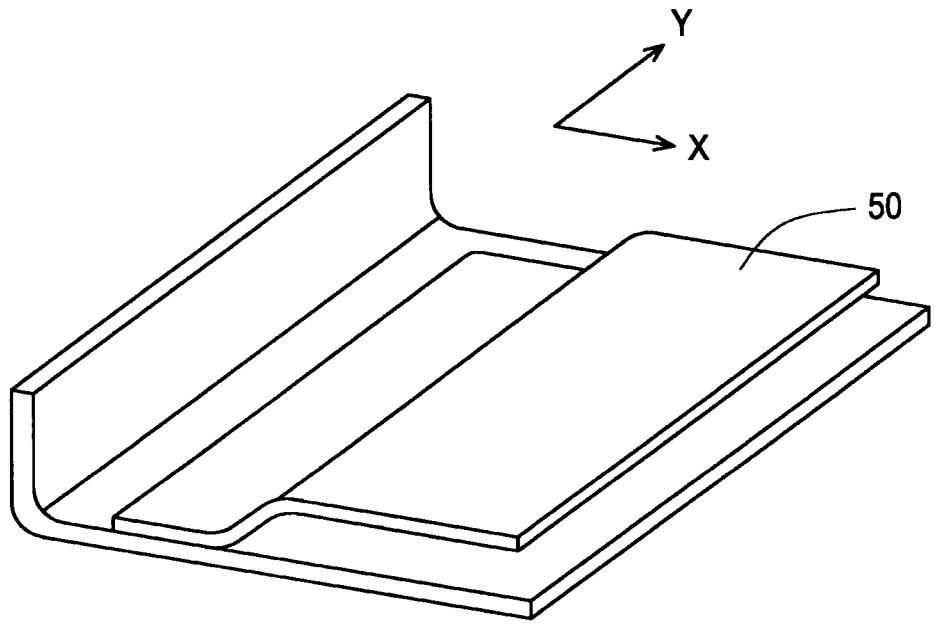
FIG. 2 is a schematic diagram of a processing target of the hemming path planning method of FIG. 1.

FIG. 1 is a process flowchart of a hemming path planning method according to an embodiment of the disclosure. FIG. 2 is a schematic diagram of a processing target of the hemming path planning method of FIG. 1. Referring to FIG. 1 and FIG. 2, the hemming path planning method according to the embodiment includes the following steps. First, in step S10, an initial contour data of a target 50 is scanned to obtain. The target 50 according to the embodiment is a sheet metal to be hemmed, but the disclosure is not limited thereto. From the initial contour data, for example, shape features may be extracted to generate a processing position. Then, in step S20, a first segment of a hemming path is planned according to the initial contour data, where the first segment corresponds to a first bending angle. The first bending angle according to this embodiment is 60 degrees as an example, but the disclosure is not limited thereto. In other words, a hemming process planned by the hemming path planning method according to this embodiment does not aim to complete the hemming at a time, but to pre-hem a certain angle first and finish the hemming finally.

Then, in step S30, a second segment of the hemming path is planned according to the initial contour data and an expected springback amount related to the first bending angle, where the second segment corresponds to a second bending angle. For example, the first segment of the hemming path is used as a basis, and the first segment is modified according to the expected springback amount related to the first bending angle to obtain the second segment of the hemming path. Here, the hemming path is still in a planning stage, and no actual processing is performed on the target 50. However, since the expected springback amount related to the first bending angle is introduced, it is not necessary to re-measure the contour data of the target 50 after the actual processing of the first segment to plan the second segment of the hemming path. Finally, in step S40, the first segment and the second segment are combined to obtain a continuous hemming path. According to the above, it is only explained that the hemming path is obtained by combining the first section and the second section. According to other embodiments, the hemming path may also be obtained by combining two or more segments, and the disclosure is not limited thereto. According to other embodiments, when planning more segments or other subsequent processing paths, the expected springback amount may also be introduced to improve accuracy of processing.

According to the above, since the hemming path is completely planned in advance, there is no need to measure and modify the path during processing, and processing speed may be increased. In addition, since the expected springback amount is introduced, the processing tool and the target may contact each other at an ideal and accurate position and angle to ensure good quality of a finished product of the hemming process.

Figure 3A:
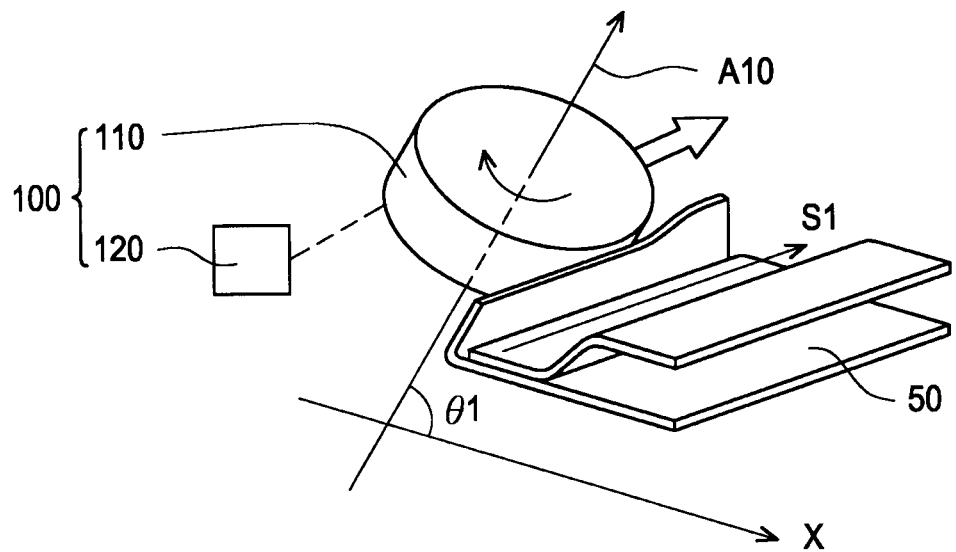
FIG. 3A to FIG. 3C are schematic diagrams of implementing a process after the hemming path planning method of FIG. 1 is completed.
Figure 3B:
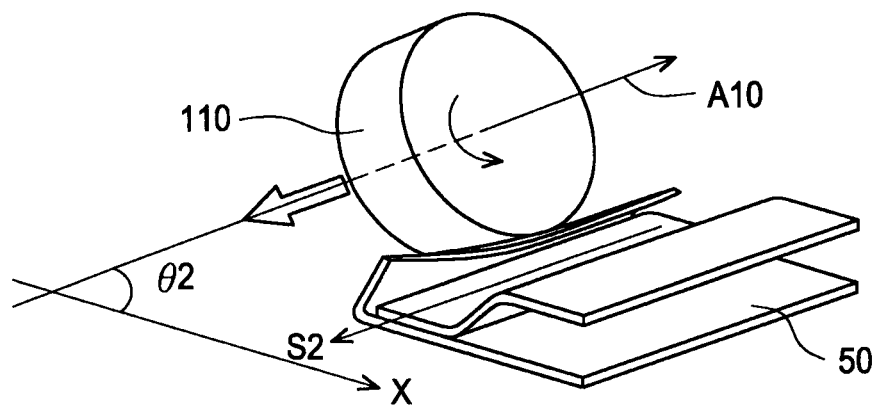
Figure 3C:
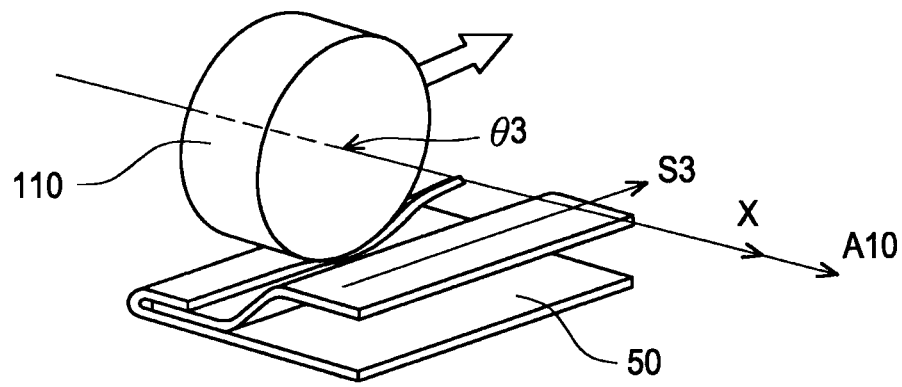

FIG. 3A to FIG. 3C are schematic diagrams of implementing a process after the hemming path planning method of FIG. 1 is completed. In FIG. 3B and FIG. 3C, referring to FIG. 1 and FIG. 3A, a hemming system 100 according to this embodiment includes a processing tool 110 and a processor 120. The processing tool 110 is configured to contact and apply pressure to the target 50. The processor 120 is configured to perform the hemming path planning method. The processing tool 110 is configured to perform the hemming process on the target 50 according to the hemming path obtained from the processor 120. In FIG. 3A, the processing tool 110 according to this embodiment is a rolling wheel. In a first segment S1 of the hemming path planned by the hemming path planning method, the processing tool 110 rotates around an axis A10 of a geometric center axis of the processing tool 110, and an angle between the axis A10 and an X axis of a plane where the target 50 is located, that is, a first bending angle θ1, is 60 degrees. According to one embodiment, the processing tool may be held by a robotic arm for processing; according to another embodiment, the processor may be connected to a controller of the robotic arm.

Referring to FIG. 1 and FIG. 3B, after completing the first segment of the hemming path, the processing tool 110 contacts the target 50 with a second segment S2 of the hemming path taking into account the expected springback amount, and hems the target 50 with a second bending angle θ2 of 30 degrees. Referring to FIG. 1 and FIG. 3C, after completing the second segment of the hemming path, the processing tool 110 contacts the target 50 with a third segment S3 of the hemming path taking into account the expected springback amount, and hems the target 50 with a third bending angle θ3 of 0 degree. At this point, the hemming process is completed. It should be noted that the first segment, the second segment, and the third segment of the hemming path are connected in series at the planning stage of the path, so the processing of FIG. 3A to FIG. 3C is completed continuously.

Figure 4:
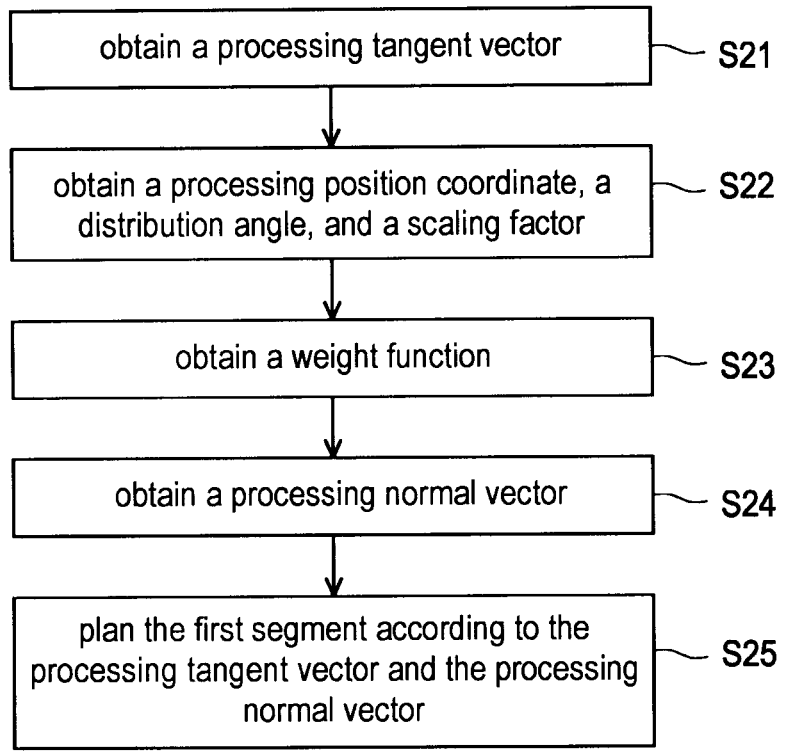
FIG. 4 is a process flowchart of planning a first segment of the hemming path planning method of FIG. 1.
Figure 5:
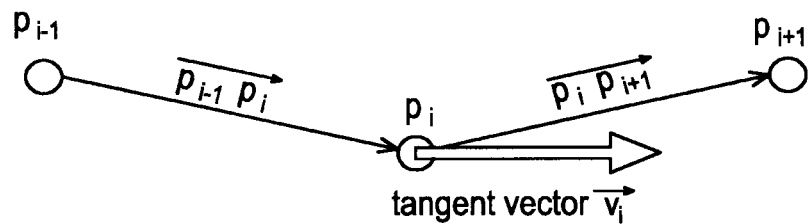
FIG. 5 is a schematic diagram of a processing tangent vector obtained in the process of FIG. 4.

FIG. 4 is a process flowchart of planning a first segment of the hemming path planning method of FIG. 1. Referring to FIG. 4, according to this embodiment, a method for planning the first segment includes the following steps. First, in step S21, a processing tangent vector is obtained according to an initial contour data and a processing position. Further, from the initial contour data, for example, shape features may be extracted to generate the processing position, and then the processing tangent vector may be obtained successively. FIG. 5 is a schematic diagram of a processing tangent vector obtained in the process of FIG. 4. Referring to FIG. 5, $p_i$ is a current processing position coordinate, $p_{i-1}$ is a previous processing position coordinate, $p_{i+1}$ is a next processing position coordinate, and the processing tangent vector is $\vec{v}_i$. When calculating the processing tangent vector $\vec{v}_i$, for example, the following formula (1) is used. That is, the processing tangent vector $\vec{v}_i$ is related to a vector formed by $p_{i-1}$ and $p_i$ and a vector formed by $p_i$ and $p_{i+1}$.

$$\vec{v}_i = \frac{\overrightarrow{p_{i-1}p_i} + \overrightarrow{p_ip_{i+1}}}{2}, . \qquad \text{formula (1)}$$

Referring to FIG. 4, in step S22, a processing position coordinate, a distribution angle, and a scaling factor is obtained according to the processing position and the processing tangent vector.

According to this embodiment, the distribution angle is δ. When calculating the distribution angle δ, for example, the following formula (2) is used, where $\hat{x}$ is a unit vector for each of coordinate axes.

$$\delta = \cos^{-1}\left(\frac{\vec{v}_i \cdot \hat{x}}{\|\vec{v}_i\|}\right), . \qquad \text{formula (2)}$$

According to this embodiment, the scaling factor includes $s_1$ and $s_2$. When calculating the scaling factor $s_1$ and $s_2$, for example, the following formulas (3) and (4) are used, where $\hat{x}$ is the unit vector for the each of the coordinate axes, $$s_1 = \frac{\vec{u}_i \cdot \vec{v}_i}{\|\vec{v}_i\|}, , \qquad \text{formula (3)}$$

$$s_2 = \left\| \vec{u_i} - \frac{\vec{u_i} \cdot \vec{v_i}}{\|\vec{v_i}\|^2} \vec{v_i} \right\|, \quad \text{formula (4)}$$

where $\vec{u_i} = \overrightarrow{p_{i-1}p_{i+1}}$.

Referring to FIG. 4, in step S23, a weight function is obtained according to the scaling factor, the processing position, the distribution angle, and the processing position coordinate.

According to this embodiment, the weight function is f(P). When calculating the weight function f(P), for example, the following formula (5) is used, where P is any point on the processing path.

$$f(P) = \frac{1}{(2\pi)^2 |\Sigma|^{0.5}} e^{[-0.5(p-p_i)^T R(\delta)^T \Sigma^{-1} R(\delta)(p-p_i)]}, \quad \text{formula (5)}$$

where $\Sigma = \begin{bmatrix} s_1 & 0 \\ 0 & s_2 \end{bmatrix}$, $R(\delta) = \begin{bmatrix} \cos(\delta) & \sin(\delta) \\ -\sin(\delta) & \cos(\delta) \end{bmatrix}$, $P = \{p \mid \|p - p_i\| < r\}$, $r = \max(\|p_i - p_{i+1}\|, \|p_i - p_{i-1}\|)$.

Figure 6:
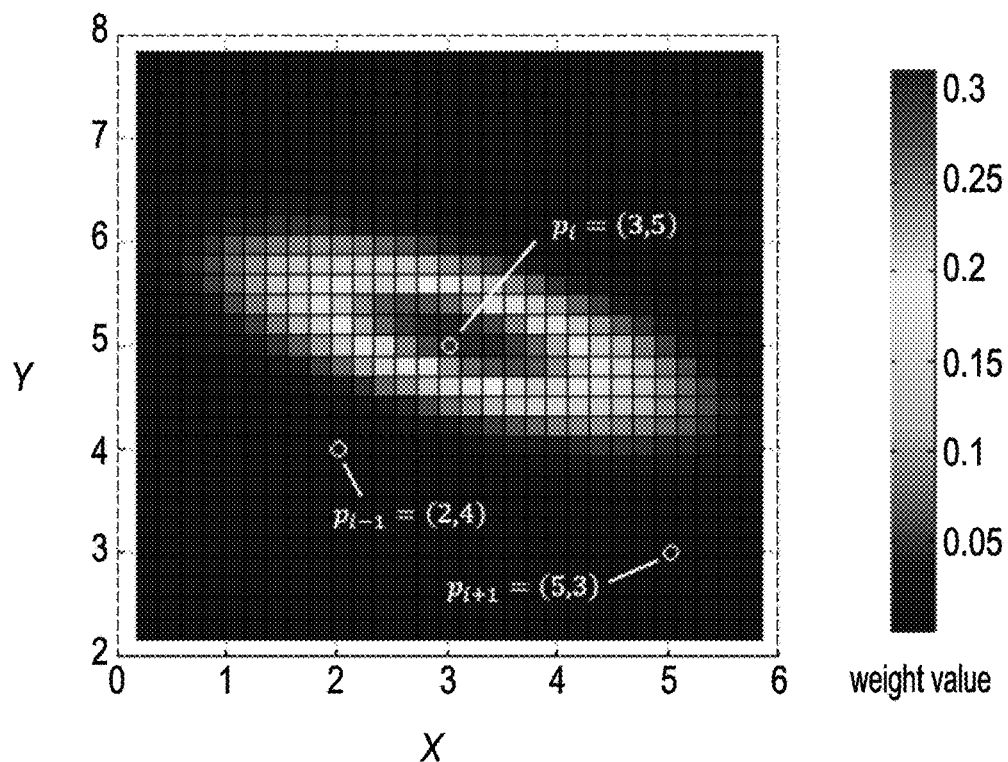
FIG. 6 is a schematic diagram of an example of a weight function obtained in the process of FIG. 4.

FIG. 6 is a schematic diagram of an example of a weight function obtained in the process of FIG. 4. Referring to FIG. 6, after the weight function f(P) is calculated, the distribution of weight values of points in the neighborhood of the any point P may be drawn, and corresponding weight values may be obtained by substituting coordinates $p_i(3,5)$, $p_{i-1}(2,4)$ and $p_{i+1}(5,3)$ of the X-Y axis, for example.

Referring to FIG. 4 again, in step S24, a processing normal vector is obtained according to the initial contour data, the processing position, and the weight function. A plane fitting method may be used to smoothly vary the obtained processing normal vector. Finally, in step S25, the first segment of the hemming path is planned according to processing tangent vectors and processing normal vectors of all processing positions.

Figure 7:
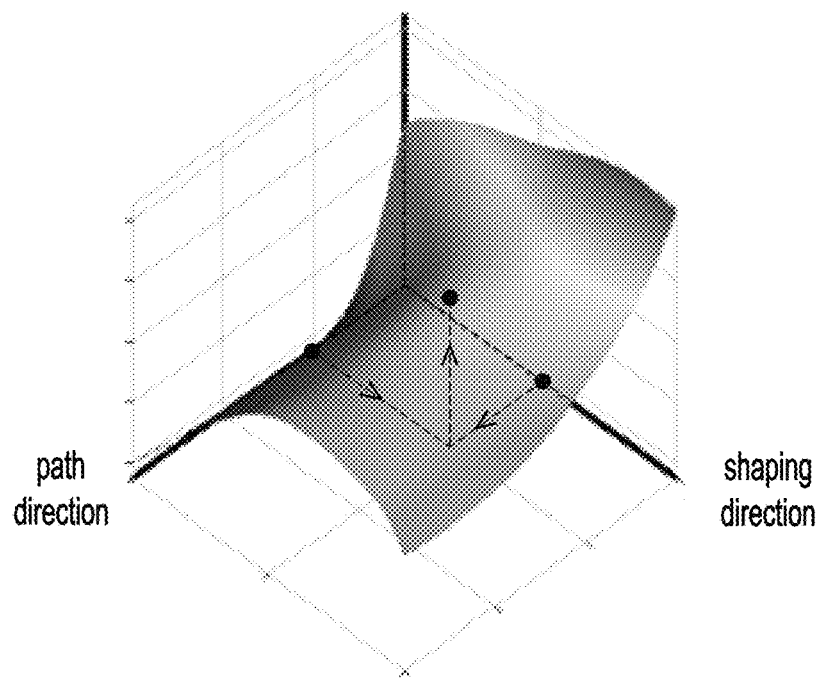
FIG. 7 is a schematic diagram of an example of a lookup table of a springback angle in the hemming path planning method of FIG. 1.

FIG. 7 is a schematic diagram of an example of a lookup table of a springback angle in the hemming path planning method of FIG. 1. Referring to FIG. 7, according to this embodiment, a method for obtaining the expected springback amount related to the first bending angle includes the followings. A geometric size of the target 50 is obtained first. Then, the geometric size of the target 50 is simulated by the analysis software of engineering mechanics to produce the geometric size of the target 50 after the first segment of the hemming path. Next, a corresponding expected springback amount is found using a shaping direction and a path direction as coordinate axes.

In summary, the hemming path planning method and the hemming system of the disclosure adopt the expected springback amount and pre-plan the processing path of the later segment, so that the complete processing path may be planned without re-measurement of the target during processing, which may greatly accelerate the processing speed.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hemming method comprising:
   scanning to obtain an initial contour data of a target;
   planning a first segment of a hemming path according to the initial contour data by a processor, wherein the first segment corresponds to a first bending angle;
   planning a second segment of the hemming path according to the initial contour data and an expected springback amount related to the first bending angle by the processor, wherein the second segment corresponds to a second bending angle; and
   combining the first segment and the second segment to obtain the hemming path by the processor, wherein the hemming path is continuous,
   perform a hemming process on the target according to the hemming path obtained from the processor by a processing tool,
   wherein planning the first segment comprises:
   obtaining a processing tangent vector according to the initial contour data and a processing position;
   obtaining a processing position coordinate, a distribution angle, and a scaling factor according to the processing position and the processing tangent vector;
   obtaining a weight function according to the scaling factor, the processing position, the distribution angle, and the processing position coordinate;
   obtaining a processing normal vector according to the initial contour data, the processing position, and the weight function; and
   planning the first segment according to the processing tangent vector and the processing normal vector.

2. The hemming method according to claim 1, wherein obtaining the expected springback amount related to the first bending angle comprises finding a corresponding expected springback amount using a shaping direction and a path direction as coordinate axes.

3. The hemming method according to claim 1, wherein the processing tangent vector is $\vec{v_i}$, $p_i$ is a current processing position coordinate, $p_{i-1}$ is a previous processing position coordinate, and $p_{i+1}$ is a next processing position coordinate $$\vec{v_i} = \frac{\overrightarrow{p_{i-1}p_i} + \overrightarrow{p_ip_{i+1}}}{2}.$$

4. The hemming method according to claim 3, wherein the distribution angle is $\delta$, where $\hat{x}$ is a unit vector for each of coordinate axes.

$$\delta = \cos^{-1}\left(\frac{\vec{v_i} \cdot \hat{x}}{\|\vec{v_i}\|}\right).$$

5. The hemming method according to claim 4, wherein the scaling factor comprises $s_1$ and $s_2$, $$s_1 = \frac{\vec{u_i} \cdot \vec{v_i}}{\|\vec{v_i}\|}, s_2 = \left\| \vec{u_i} - \frac{\vec{u_i} \cdot \vec{v_i}}{\|\vec{v_i}\|^2} \vec{v_i} \right\|, \vec{u_i} = \overrightarrow{p_{i-1}p_{i+1}}.$$

6. The hemming method according to claim 1, wherein the weight function is f(P), $$f(P) = \frac{1}{(2\pi)^2 |\Sigma|^{0.5}} e^{[-0.5(p-p_i)^T R(\delta)^T \Sigma^{-1} R(\delta)(p-p_i)]},$$

-continued $$\Sigma = \begin{bmatrix} s_1 & 0 \\ 0 & s_2 \end{bmatrix}, R(\delta) = \begin{bmatrix} \cos(\delta) & \sin(\delta) \\ -\sin(\delta) & \cos(\delta) \end{bmatrix},$$

$$P = \{p \mid \|p - p_i\| < r\},$$

$$r = \max(\|p_i - p_{i+1}\|, \|p_i - p_{i-1}\|).$$

7. A hemming system comprising:
a processing tool configured to contact and apply pressure to a target; and
a processor configured to:
  scan to obtain an initial contour data of the target;
  plan a first segment of a hemming path according to the initial contour data, wherein the first segment corresponds to a first bending angle;
  plan a second segment of the hemming path according to the initial contour data and an expected springback amount related to the first bending angle, wherein the second segment corresponds to a second bending angle; and
  combine the first segment and the second segment to obtain the hemming path, wherein the hemming path is continuous,
  wherein the processing tool is configured to perform a hemming process on the target according to the hemming path obtained from the processor,
  wherein to plan the first segment, the processor is further configured to:
  obtain a processing tangent vector according to the initial contour data and a processing position;
  obtain a processing position coordinate, a distribution angle, and a scaling factor according to the processing position and the processing tangent vector;
  obtain a weight function according to the scaling factor, the processing position, the distribution angle, and the processing position coordinate;
  obtain a processing normal vector according to the initial contour data, the processing position, and the weight function; and
  plan the first segment according to the processing tangent vector and the processing normal vector.

8. The hemming system according to claim 7, wherein the processing tool is a rolling wheel.

9. The hemming system according to claim 7, wherein a method for the processor to obtain the expected springback amount related to the first bending angle comprises finding a corresponding expected springback amount using a shaping direction and a path direction as coordinate axes.

* * * * *